(12) United States Patent
Mitsis

(10) Patent No.: US 7,303,666 B1
(45) Date of Patent: Dec. 4, 2007

(54) WATER FILTRATION SYSTEM

(76) Inventor: Charles W. Mitsis, 7973 E. Luke La., Scottsdale, AZ (US) 85250

( * ) Notice: Subject to any disclaimer, the term of this patent is extended or adjusted under 35 U.S.C. 154(b) by 487 days.

(21) Appl. No.: 10/947,992

(22) Filed: Sep. 22, 2004

(51) Int. Cl.
| | |
|---|---|
| *B01D 29/62* | (2006.01) |
| *B01D 29/50* | (2006.01) |
| *B01D 63/00* | (2006.01) |
| *B01D 61/00* | (2006.01) |

(52) U.S. Cl. .............. 210/106; 210/136; 210/195.1; 210/196; 210/257.1; 210/321.72; 210/260

(58) Field of Classification Search .............. None
See application file for complete search history.

(56) References Cited

U.S. PATENT DOCUMENTS

| | | | | |
|---|---|---|---|---|
| 3,542,199 A | * | 11/1970 | Bray et al. ........... | 210/116 |
| 4,629,568 A | * | 12/1986 | Ellis, III ............ | 210/636 |
| 4,776,952 A | * | 10/1988 | Burrows ............. | 210/110 |
| 5,653,877 A | * | 8/1997 | Mark ................ | 210/259 |
| 6,110,360 A | * | 8/2000 | Hart, Jr. ............ | 210/110 |
| 2005/0205478 A1 | * | 9/2005 | Kung et al. .......... | 210/106 |

* cited by examiner

*Primary Examiner*—Krishnan S. Menon
(74) *Attorney, Agent, or Firm*—LaValle D. Ptak

(57) ABSTRACT

A water filtration system includes a filter for receiving water to be filtered and having an output. A water storage vessel is connected to receive water from the filter output; and water is removed from the storage vessel and supplied back to the input of the filter, whereupon filtered water to be utilized is obtained solely from the output of the filter.

16 Claims, 6 Drawing Sheets

WATER FILTRATION SYSTEM

BACKGROUND

The present invention relates to water filtration systems for filtering water from the source of water prior to delivering that water for utilization.

DETAILED DESCRIPTION

Figure 1:
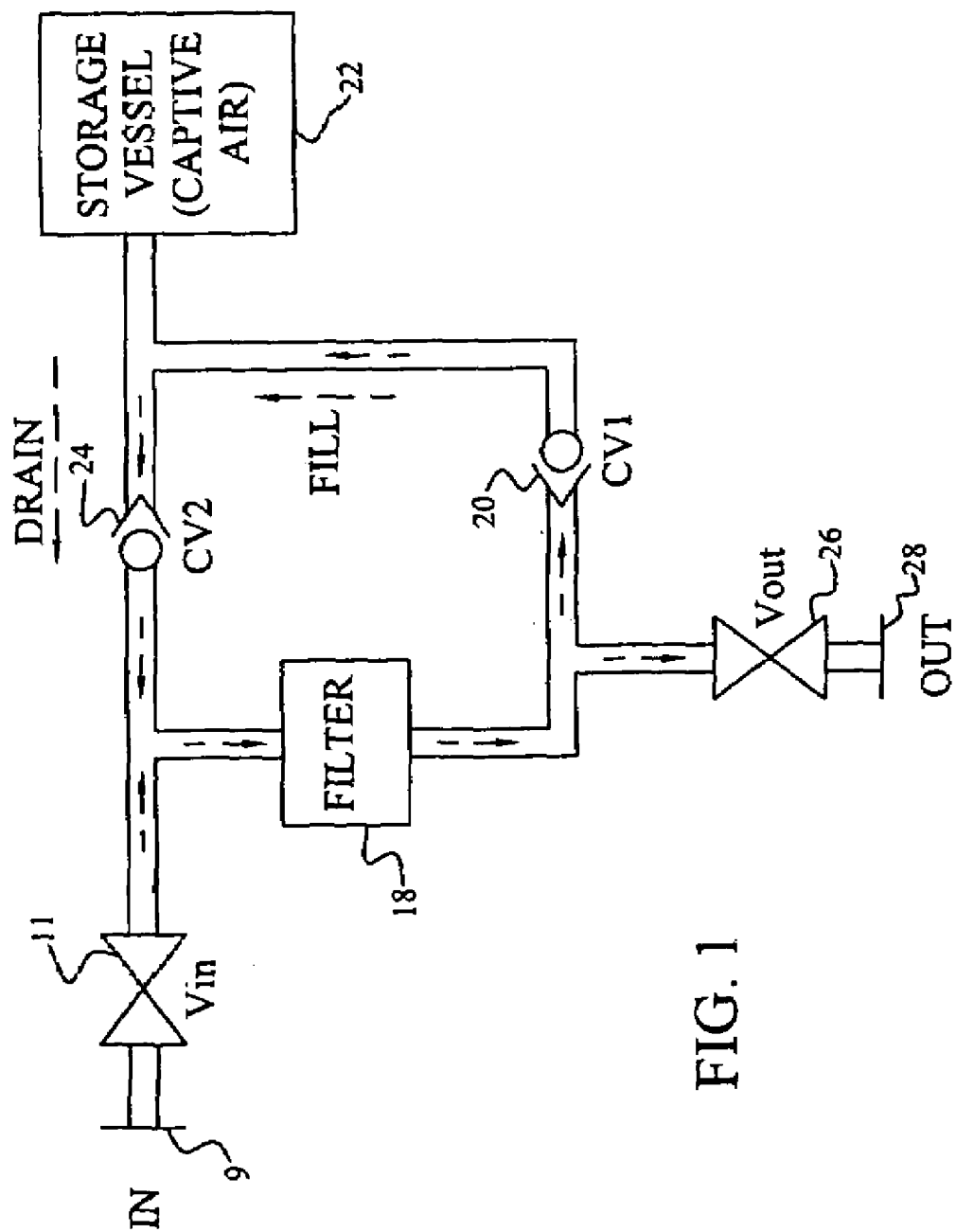
FIG. 1 is a block diagram of an embodiment of the invention.

Reference now should be made to the drawings in which the same reference numbers are used in the various figures to designate the same or similar components. FIG. 1 is a water filter system where water from a suitable source is applied through an input pipe at 9 to a control valve 11. The valve 11 either may be manually operated or electrically operated, depending upon the particular environment in which the system is used. In the embodiment of FIG. 1, the valve 11 functions to supply water to a filter 18 when the valve is open.

The source of water supplied to the input 9 typically is obtained from a municipal water source, a well, or a cistern. The particular origin of the water supplied to the input 9 is not important; and it can be obtained from any suitable conventional source.

As shown in FIG. 1, the water passing through the filter 18 is supplied to one or the other of two paths. One of these paths is through an on/off water utilization valve 26 coupled to an output 28. The output 28 is supplied to any desired utilization system, such as a drinking water tap or the like. This supply occurs when the valve 26 is open.

When the valve 26 is closed, however, the output flow from the filter 18, as supplied by the input pipe 9, passes through a check valve 20 to the input of a storage vessel 22. In the embodiment shown in FIG. 1, the storage vessel is indicated as a captive air storage vessel of the type which uses an air pressure bladder tank to receive water from a source (in this case, the output of the filter 18 through the check valve 20) until a predetermined pressure is reached, at which time water flow into the pressure vessel is terminated by any suitable conventional means.

As is apparent from the description provided thus far, storage of the water in the storage vessel 22 is effected through a first filtration of that water through the filter 18; so long as the valve 11 is opened. When the valve 11 is closed (typically after the storage vessel desired pressure is reached), the system remains in a static condition of operation as long as the output valve 26 also is closed. Opening of the output valve 26 at some subsequent time, however, then allows the water in the pressure storage vessel 22 to be supplied through another check valve 24 back to the input of the filter 18. The check valve 20 closes to prevent flow from the storage vessel 22 back into the output side of the filter 18.

The water flow from the storage vessel 22 through the check valve 24 and the filter 18 then passes outwardly through the open output valve 26 to the utilization output at 28. It is to be noted that all of the water supplied out of the storage vessel is filtered by the filter 18 a second time, providing a dual pass of water through the filter 18. The first pass through the filter 18 is from the output of the input valve 11, which supplies the water to the storage vessel 22 initially. The second passage of water through the filter 18 is whenever the storage vessel 22 supplies that water through the check valve 24 for utilization at 28, when the valve 26 is opened.

By providing this second filtration of the water supplied from the storage vessel 22, any stagnancy or contamination of the water which may occur in the storage vessel 22 is filtered by the unidirectional flow of water through the filter 18 prior to supplying that water to the output 28. The system is a very simple system, not requiring any recirculating pump or similar provisions to ensure that the water supplied at the output 28 always is filtered.

Figure 2B:
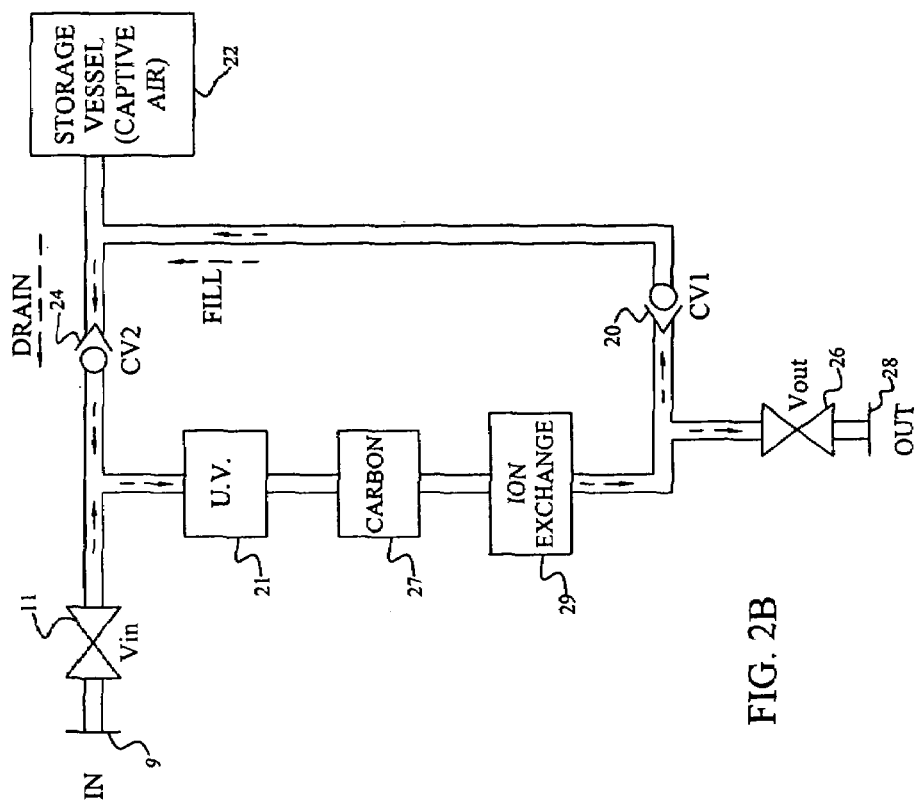
FIG. 2B is a block diagram of a variation of the embodiment of FIG. 2A.
Figure 2A:
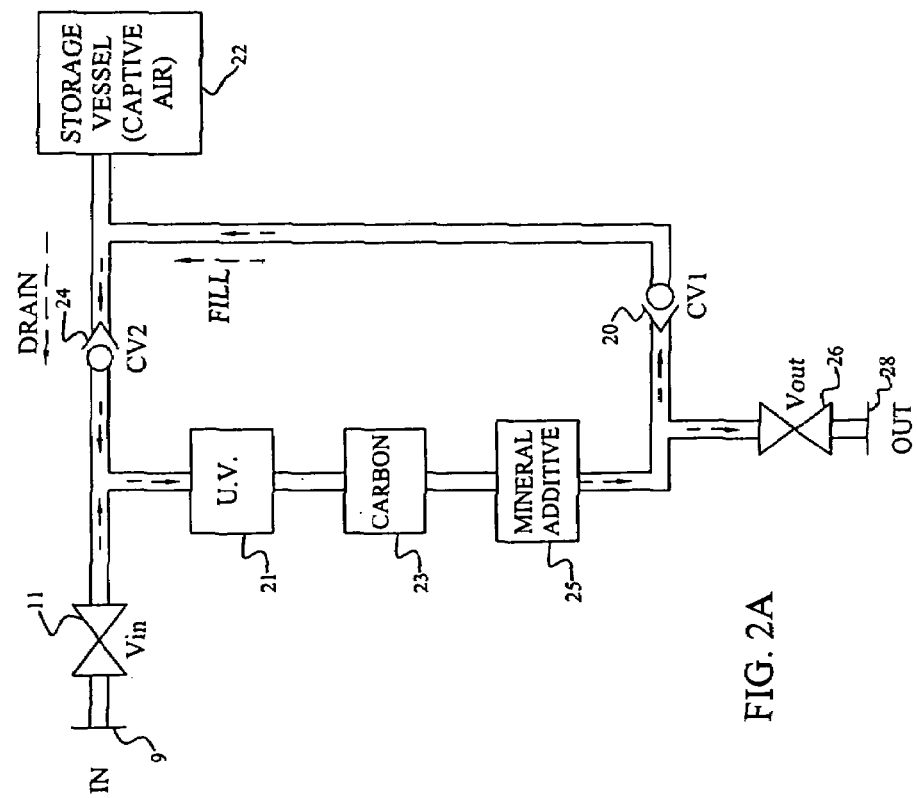
FIG. 2A is a block diagram of another embodiment of the invention.

Reference now should be made to FIG. 2A, which is a modification of the system shown in FIG. 1 and which includes additional components. In the system of FIG. 2A, the water input at 9 is obtained in the same manner, from the same types of sources described above in conjunction with FIG. 1. The system shown in FIG. 2A is substantially identical to the one of FIG. 1, and operates in the same manner as described above in conjunction with FIG. 1. In the system of FIG. 2A, however, the filter 18 of FIG. 1 has been shown as being replaced by three different stages, including an ultraviolet or U.V. sterilizer 21 of conventional configuration for sterilizing the water prior to applying it to the input of the carbon block filter 23. The output of the filter 23 then is supplied through a device 25 for adding desired additives to the water, such as calcium (or other desired additives, depending upon the ultimate use of the water produced b the system). In all other respects, the system shown in FIG. 2A operates in the same manner as the system shown in FIG. 1, with the filter 18 being replaced with the combination of the U.V. sterilization stage 21, carbon filter 23, and mineral additive stage 25.

FIG. 2B is a variation of the system shown in FIG. 2A, and again, operates basically in the same manner as described above in conjunction with the system shown in FIG. 1. In FIG. 2B, however, the filter 18 of FIG. 1 has been replaced with a U.V. sterilization stage 21, similar to the one shown in FIG. 2A. The output of this stage then is supplied through a carbon filter 27, which in turn has its output connected to the input of an ion exchange stage 29. Again, the three-stage filtering component comprising the stages 21, 27 and 29 is substituted for and replaces the filter 18 of FIG. 1.

Figure 3:
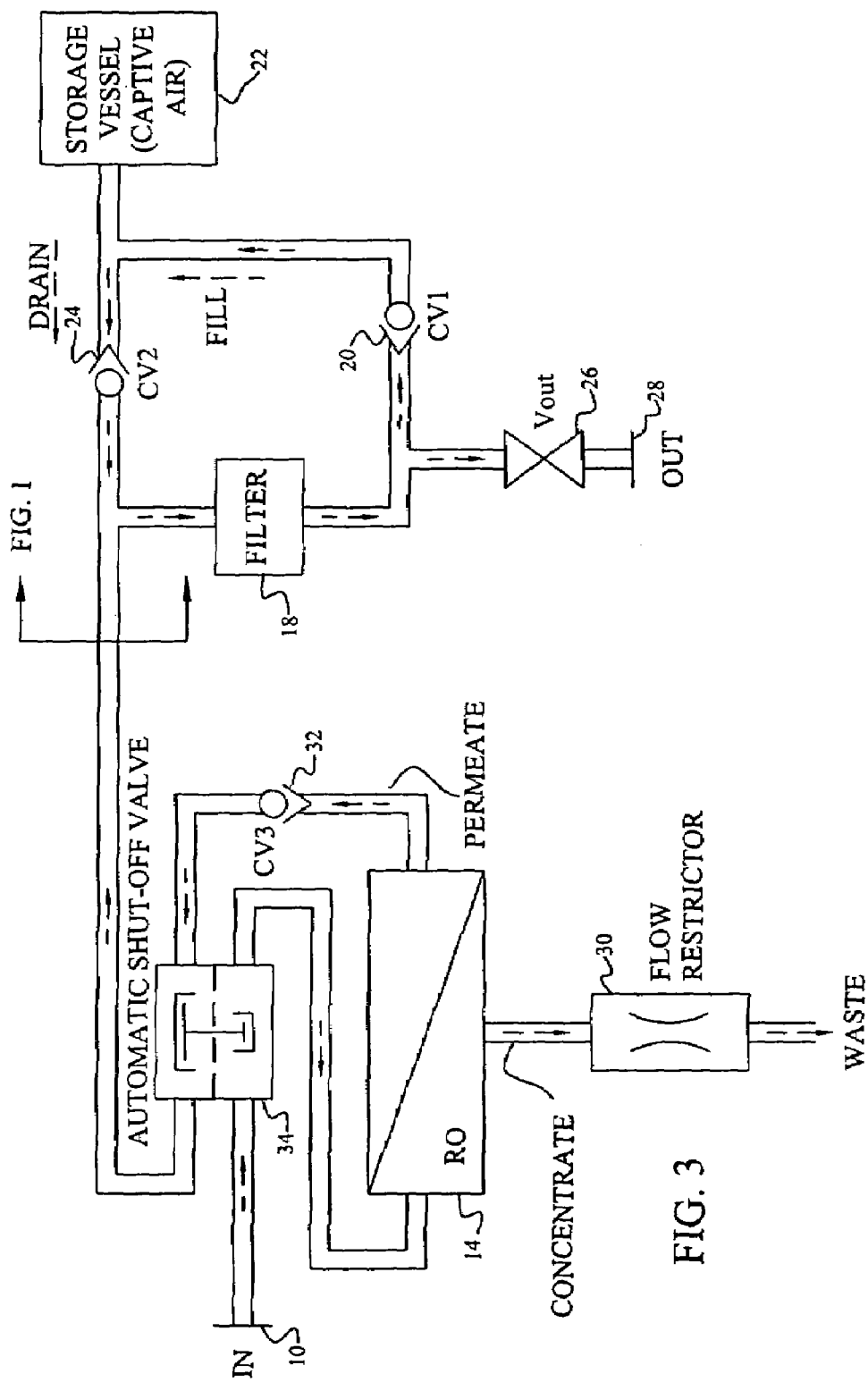
FIG. 3 is a block diagram incorporating the embodiment of FIG. 1 in a Reverse Osmosis Filtration System utilizing an automatic shut-off valve as a control element.

Reference now should be made to FIG. 3, which incorporates the system shown in FIG. 1 in a Reverse Osmosis (RO) system. In the system of FIG. 3, water input at 10 is obtained in the same manner, from the same types of sources described above in conjunction with FIG. 1. This water input is shown as supplied through an automatic shut-off valve 34 to the input of a reverse osmosis filter 14.

After passing from the output of the reverse osmosis filter 14, the water is then supplied through a check valve 32, and the through the automatic shut-off valve 34 to the input of the pressure storage vessel 24 (through the filter 18) in the same manner described above in conjunction with FIG. 1, whenever the output valve 26 is closed. Whenever water is provided from the storage vessel 22 through the check valve 24 to the input of the filter 18, it is blocked by the check valve 32 from passage into the reverse osmosis filter 14. Control of the water flow into the reverse osmosis filter 14 of FIG. 2, however, is automatically effected by means of the automatic shut-off valve 34. Waste concentrate from the reverse osmosis filter 14 is supplied through a conventional flow restrictor 30. In all other respects, however, the operation of the system of FIG. 2 is the same as the one described above in conjunction with FIG. 1.

Figure 4:
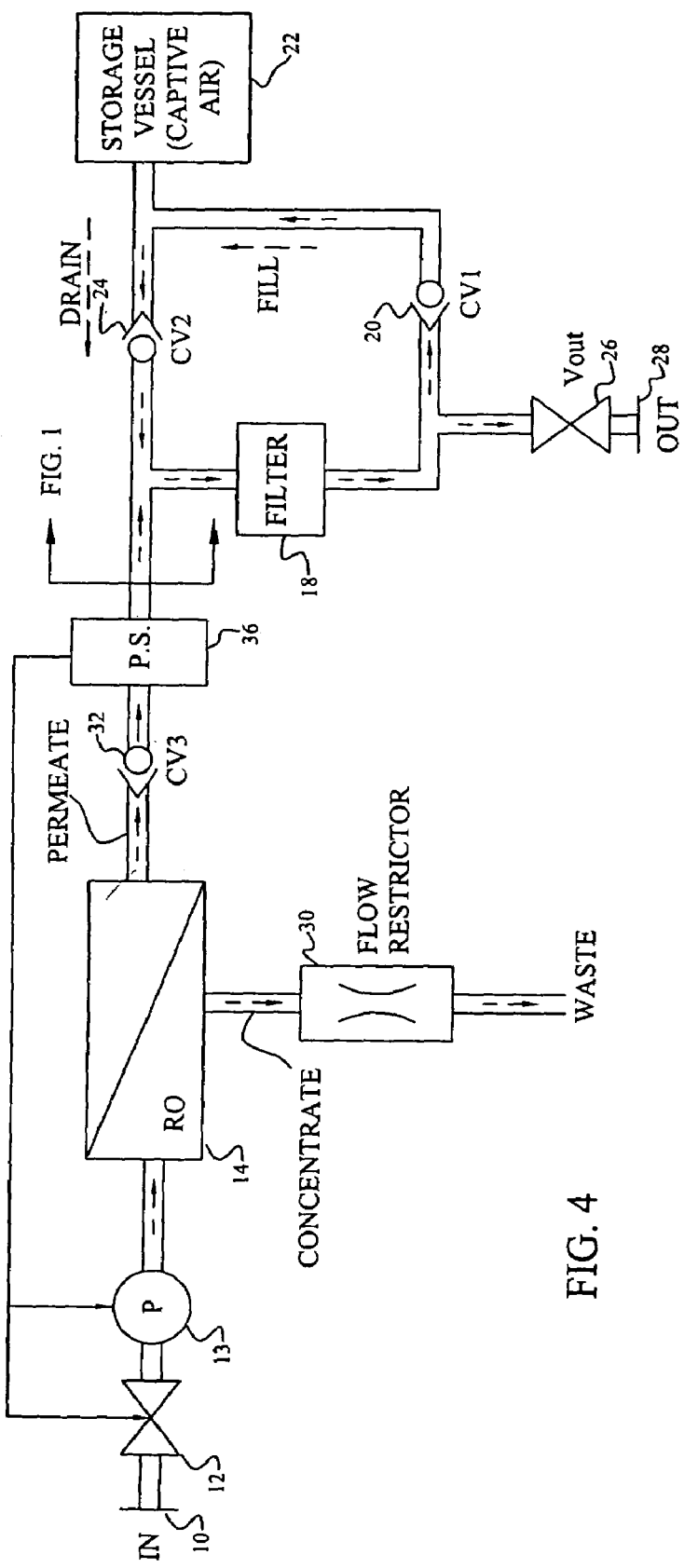
FIG. 4 is a block diagram incorporating the embodiment of FIG. 1 in a Reverse Osmosis Filtration System utilizing a differential pressure switch as a control element.

Reference now should be made to FIG. 4, which also incorporates the system shown in FIG. 1 in another configuration of a reverse osmosis system. In the system of FIG. 4, the water input at 10 is obtained in the same manner, from the same types of sources described above in conjunction with FIG. 1. This water is shown as supplied through an electrical control valve 12 and through a pressure boosting pump 13 to the input of the reverse osmosis filter 14.

In FIG. 4, the valve 12 is an electrically controlled valve which is controlled by a differential pressure switch 36 located near the input of the filter 18. The switch 36 monitors the pressure of the storage vessel 22. The differential pressure switch 36 also controls the operation of the pressure boosting pump 13. The pump 13 may not always be needed; and it can be eliminated if it is not used.

After passing from the output of the reverse osmosis filter 14, the water is supplied through the check valve 32, and then through the filter 18 to the input of the pressure storage vessel 22 in the same manner described above in conjunction with FIG. 1, whenever the output valve 26 is closed. Again, whenever water is provided from the storage vessel 22 through the check valve 24 to the input of the filter, it is blocked by the check valve 32 from passage back into the reverse osmosis filter 14. Control of water flow into the input of the reverse osmosis filter 14 of FIG. 4, however, automatically is effected by means of the electric valve 12. In all other respects, the operation of the system of FIG. 4 is the same as the one described above in conjunction with FIG. 1.

Figure 5:
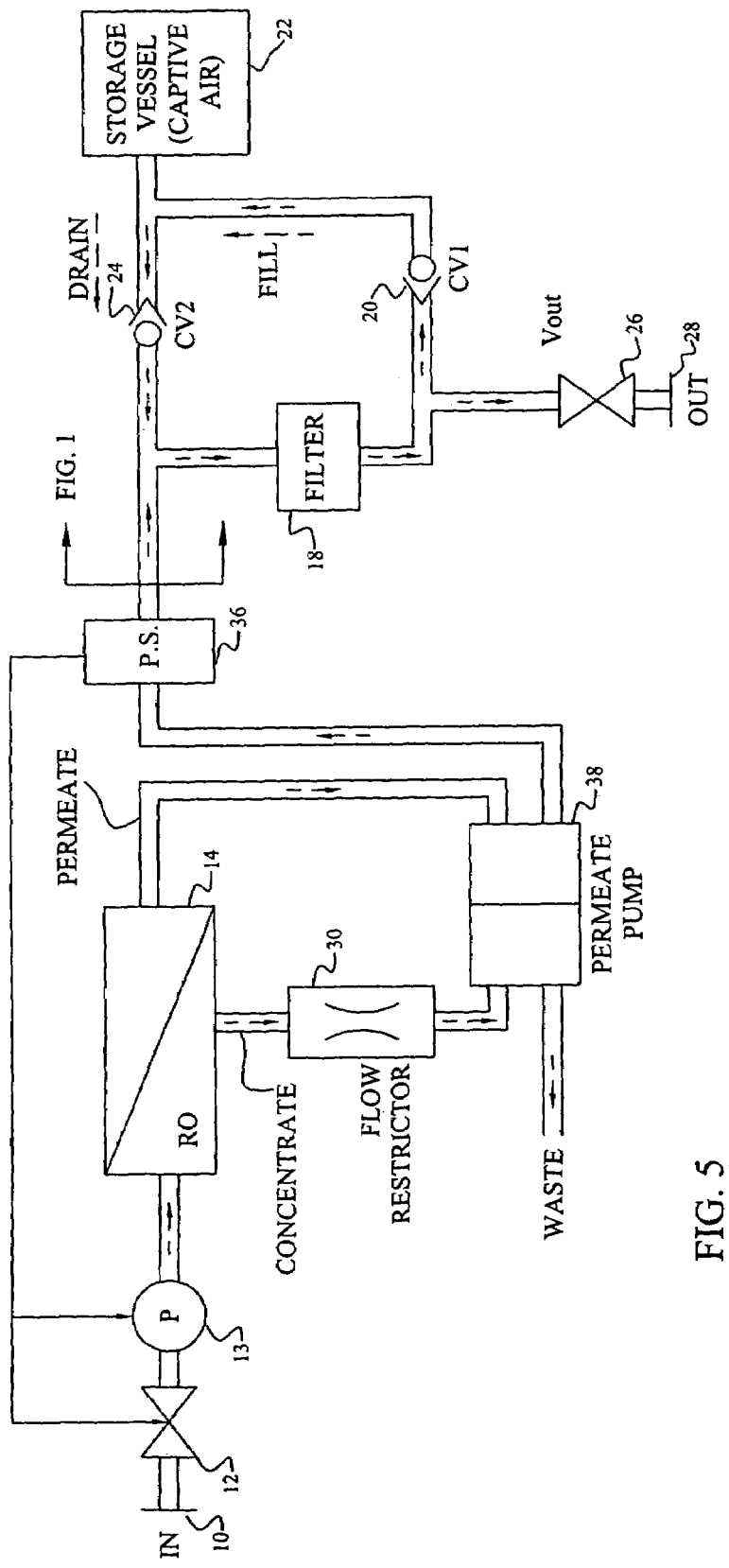
FIG. 5 is a block diagram incorporating the embodiment of FIG. 1 in a Reverse Osmosis Filtration System with a permeate pump utilizing a differential pressure switch as a control element.
Figure 1:
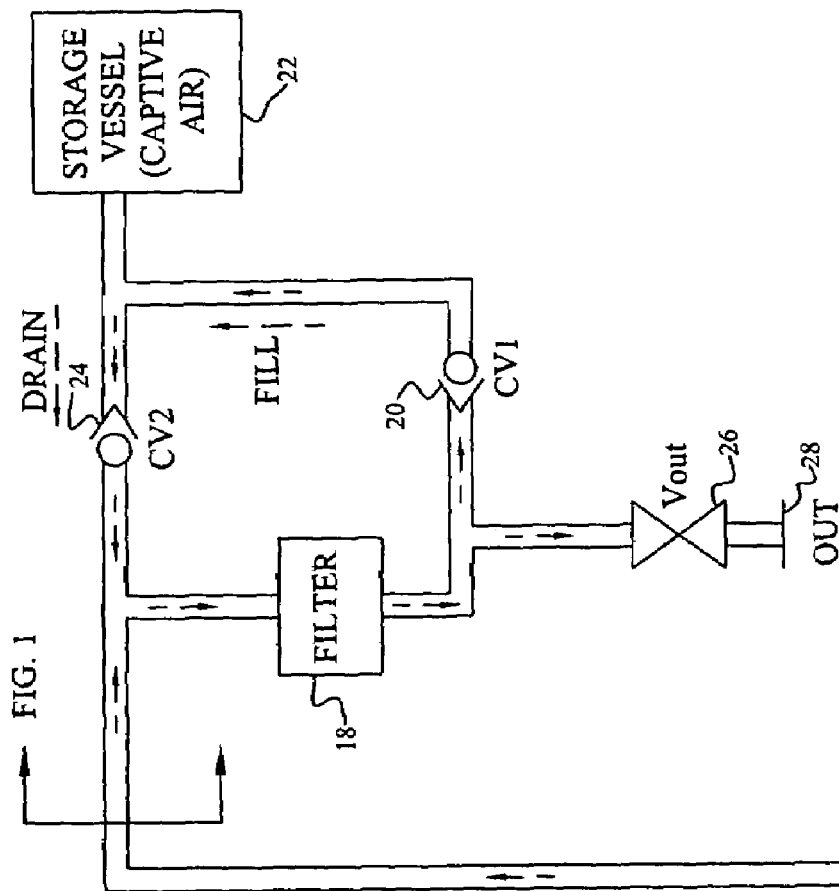

Reference now should be made to FIG. 5, which is a modification of the system shown in FIG. 4. In the system of FIG. 5, water input at 10 is obtained in the same manner and from the same types of sources as described above in conjunction with FIGS. 1 and 4. The water is shown as supplied through an electric valve 12 and through an optional pressure boosting pump 13 to the input of the reverse osmosis filter 14. As in the system shown in FIG. 4, the valve 12 is controlled by a differential pressure switch 36 located near the input of the filter 18 to monitor the pressure of the storage vessel 22. As mentioned in conjunction with the system of FIG. 4, the pressure boosting pump 13 may not always be needed; and it can be eliminated if it is not used.

After passing from the output of the reverse osmosis filter 14, the water is supplied through a permeate pump 38 to the input of the floater 18, and ultimately, to the pressure storage vessel 22 in the same manner described above in conjunction with FIG. 1. This occurs whenever the output valve 26 is closed. Whenever water is provided from the storage vessel 22 through the check valve 24 to the input of the filter 18, it is blocked by the permeate pump 38 from passage into the reverse osmosis filter 14. The manner of operation of such a permeate pump is standard and well known; so that no details of that operation are considered necessary here. Again, as in the case of the system of FIG. 4, control of water into the reverse osmosis filter 14 of FIG. 5 is automatically effected by means of the electric valve 12.

Figure 6:
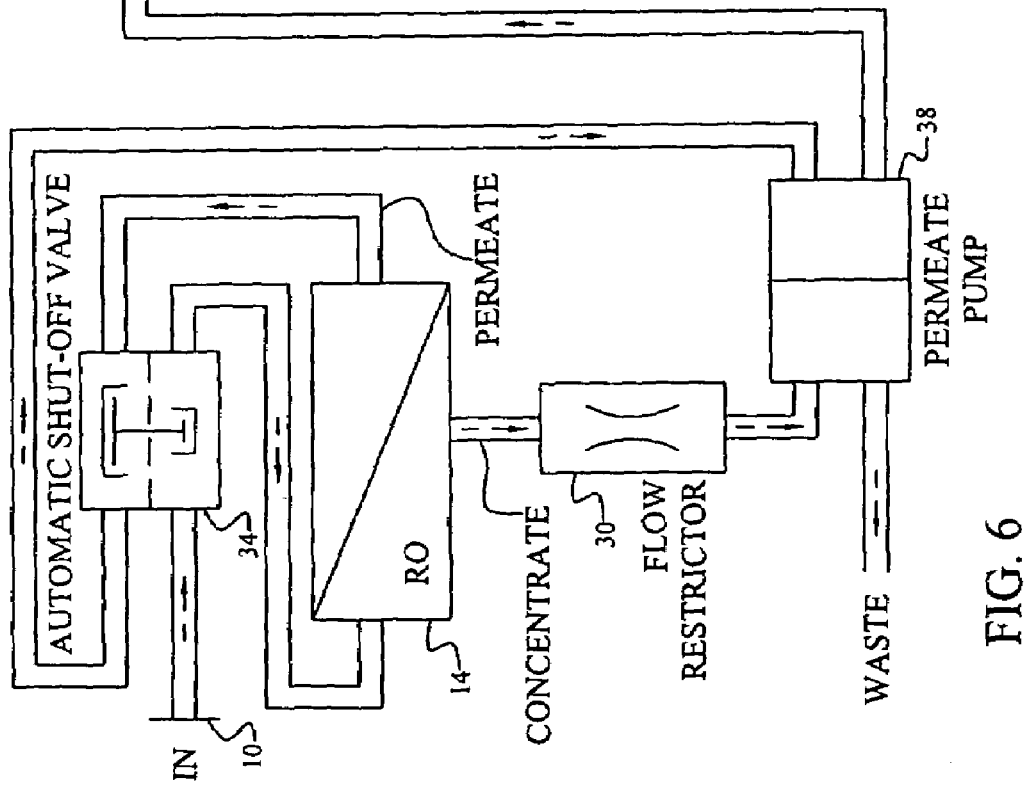
FIG. 6 is a block diagram incorporating the embodiment of FIG. 1 in a Reverse Osmosis Filtration System with a permeate pump utilizing an automatic shut-off valve as a control element.

Reference now should be made to FIG. 6, which is a further variation of the system employing a reverse osmosis filter 14, and incorporating some of the features of FIGS. 3 and 5. In the system of FIG. 6, the water input at 10 is obtained in the same manner, from the same types of sources described above in conjunction with FIGS. 1 through 5. This water is shown as supplied through an automatic shut-off valve 34 coupled to the input of the reverse osmosis filter 14.

After the water passes from the output of the reverse osmosis filter 14, it is supplied through the automatic shut-off valve 34 and then through the permeate pump 38 to the input of the pressure storage vessel 22, through the filter 18, in the same manner described above in conjunction with FIG. 1. This occurs whenever the output valve 26 is closed. Whenever water is provided from the storage vessel 22 through the check valve 34 to the input of the filter 18, it is blocked by the permeate pump 38 from passage into the reverse osmosis filter 14. The operation of the system shown in FIG. 6 essentially is a combination of the operation of the features of the system shown in FIG. 3 using an automatic shut-off valve 34, and the system of FIG. 5 using a permeate pump 38. Again, control of the water flow into the reverse osmosis filter 14 of FIG. 6 automatically is effected by means of the shut-off valve 34. In all other respects, the operation of the system of FIG. 6 is one which incorporates the operation of the basic double pass filter system of FIG. 1.

It should be noted that the double filtration of water effected by the filter 18, utilizing the system concept shown in FIGS. 1, 2 and 3 in particular, takes place whether the water input in the first instance is from another filter, such as the reverse osmosis filter 14, or is from an original unfiltered water source. If a filter such as the reverse osmosis filter 14 is not needed, it simply is eliminated; and the output of the valve 11 or 12 may be connected through an additional check-valve 16, or the water supply may be supplied through such an additional check-valve 16 without incorporating either of the valves 11 or 12, to supply water to the input of the filter 18 in the manner described above in conjunction with FIG. 1. For maximum purity of the water, however, it is desirable to have an input filter stage such as the reverse osmosis filter 14 shown in FIGS. 3,4,5 and 6. It further should be noted, however, that even if two filters (such as the filter 14 and filter 18) are employed, the reverse osmosis filter 14 may be replaced by some other suitable type of input stage filter, if the particular environment in which the system is used does not require a reverse osmosis filter 14, and another type of filter would be suitable.

An application where the various embodiments of the invention which have been described above are particularly useful is in conjunction with water systems which are de-ionization systems. In such systems, there is an ion exchange which takes place in the water stored in the storage vessel 22. When such water is stored over a period of time, however, ion exchange resins in the water contaminate the water; but the second pass of the stored water through the check-valve 24 and through the filter 18 (or filter strings 21,23,25 of FIG. 2A or 21,27,29 of FIG. 2B) purify the stored water, removing the effects of stagnation from it prior to the water being supplied through the valve 26 to the output 28. In addition, the overall system is very compact, employing a low component count, and in the most basic form described above, it does not require any electrical connections.

The foregoing description of the preferred embodiments of the invention is to be considered as illustrative, and not as limiting. Various changes and modifications will occur to those skilled in the art for performing substantially the same function, in substantially the same way, to achieve substantially the same result without departing from the true scope of the invention as defined in the appended claims.

What is claimed is:

1. A water filtration system including in combination: a reverse osmosis filtration system having an input and an output; a source of water to be filtered coupled to the input of the reverse osmosis filtration system; a filter having an input connected to the output of the reverse osmosis filtration system and the filter also having an output; a water storage vessel; an input control valve connected between the source of water and the input of the reverse osmosis filtration system; means for supplying water from the filter output to the storage vessel when the input control valve is open; means for removing water from the storage vessel and supplying the removed water to the filter input when the input control valve is closed; and means for selectively removing water from the output of the filter for utilization (non-waste) when the input control valve is open or closed.

2. A water filtration system according to Claim 1 wherein a check valve is included in the means for removing water from the storage vessel and supplying the removed water to the filter input.

3. A water filtration system according to Claim 2 wherein the means for removing water from the output of the filter for utilization includes a supply line and an output control valve.

4. A water filtration system according to Claim 3 wherein the storage vessel is a pressure storage vessel.

5. A water filtration system according to Claim 1 wherein the storage vessel is a pressure storage vessel.

6. A water filtration system according to Claim 5 wherein the means for removing from the output of the filter for utilization includes a supply line and an output control valve.

7. A water filtration system according to Claim 2 wherein the storage vessel is a pressure storage vessel.

8. A water filtration system according to Claim 1 wherein the means for removing water from the output of the filter for utilization includes a supply line and an output control valve.

9. A water filtration system including in combination; a source of water to be filtered; a first filter having an input and an output; a reverse osmosis filter system having an input and an output; an input control valve connected between the source of water and the input of the reverse osmosis filter system, the output of the reverse osmosis filter system connected to the input of the first filter; an output control valve coupled with the output of the first filter to supply filtered water therefrom; a pressure storage vessel for storing water; a first check valve; a second check valve; the first check valve being connected between the output of the first filter and the pressure storage vessel to permit water flow from the output of the first filter into the pressure vessel and to block water flow therethrough out of the pressure vessel; the second check valve being connected between the pressure vessel and the input of the first filter to permit water flow from the pressure vessel to the input of the first filter when the input control valve is closed and to block water flow from the source of water to be filtered to the pressure vessel when the input control valve is open; and an output control valve coupled with the output of the first filter for removing water for utilization (non-waste) from the first filter when the input control valve is open or closed; water for utilization being supplied by the storage vessel when the input control valve is closed.

10. A water filtration system according to Claim 9 further including means for supplying additives to water removed from the output of the first filter.

11. A water filtration system according to Claim 10 further including sterilizer means coupled to the input of the first filter for sterilizing water supplied to the input of the first filter.

12. A water filtration system according to Claim 11 further including a pressure switch coupled with the pressure storage vessel for controlling the operation of the input control valve.

13. A water filtration system according to Claim 9 further including a pressure switch coupled with the pressure storage vessel for controlling the operation of the input control valve.

14. A water filtration system according to Claim 13 further including means for supplying additives to water removed from the output of the first filter.

15. A water filtration system according to Claim 9 further including sterilizer means coupled to the input of the first filter for sterilizing water supplied to the input of the first filter.

16. A method for providing filtered water on demand through an on/off valve including; connecting the on/off valve to the output of a water filter; normally supplying water through an open control valve from a source of water to be filtered through a reverse osmosis filter system to the input of the water filter; removing water from the filter when the on/off valve is closed and supplying the removed water to a storage vessel; removing water from the storage vessel, blocking reverse flow of water through the reverse osmosis filter system, and supplying the removed water back to the input of the filter when the on/off valve is opened and the control valve is closed; and blocking reverse flow of water from the storage vessel to the output of the filter when water is removed from the storage vessel and the filter through the opened on/off valve.

* * * * *